(12) United States Patent
Bhattacharyya et al.

(10) Patent No.: US 11,714,948 B1
(45) Date of Patent: Aug. 1, 2023

(54) SYSTEM AND METHOD FOR CONSOLIDATING AND APPLYING MANUFACTURING CONSTRAINTS

(71) Applicant: Cadence Design Systems, Inc., San Jose, CA (US)

(72) Inventors: Utpal Bhattacharyya, Uttar Pradesh (IN); Randall Scott Lawson, Durham, NH (US); Edward Brian Acheson, Chelmsford, MA (US); Amit Sharma, New Delhi (IN)

(73) Assignee: Cadence Design Systems, Inc., San Jose, CA (US)

( * ) Notice: Subject to any disclaimer, the term of this patent is extended or adjusted under 35 U.S.C. 154(b) by 150 days.

(21) Appl. No.: 17/160,687

(22) Filed: Jan. 28, 2021

(51) Int. Cl.
*G06F 7/50* (2006.01)
*G06F 30/398* (2020.01)
*G06F 30/3323* (2020.01)
*G06F 115/12* (2020.01)
*G06F 111/16* (2020.01)
*G06F 111/04* (2020.01)

(52) U.S. Cl.
CPC ........ *G06F 30/398* (2020.01); *G06F 30/3323* (2020.01); *G06F 2111/04* (2020.01); *G06F 2111/16* (2020.01); *G06F 2115/12* (2020.01)

(58) Field of Classification Search
USPC .......................................... 716/112, 137, 139
See application file for complete search history.

(56) References Cited

U.S. PATENT DOCUMENTS

| | | | |
|---|---|---|---|
| 2011/0161907 A1* | 6/2011 | Cheng | G06F 30/398 716/139 |
| 2013/0212548 A1* | 8/2013 | Muddu | G06F 30/398 716/112 |
| 2021/0110095 A1* | 4/2021 | Zhang | G06F 30/31 |

* cited by examiner

*Primary Examiner* — Brian Ngo
(74) *Attorney, Agent, or Firm* — Mark H. Whittenberger; Holland & Knight LLP

(57) ABSTRACT

The present disclosure relates to a system and method for use in an electronic circuit design. Embodiments may include receiving, using a processor, one or more DFM rules files from at least one PCB fabricator and importing the one or more DFM rules files to a DFM rule aggregator database. Embodiments may also include grouping one or more rules associated with the one or more DFM rules files using an automated or manual operation. Embodiments may further include performing automatic or manual rule aggregation on the grouped rules based upon, at least in part, rules aggregation information including a DFM template file.

19 Claims, 13 Drawing Sheets

SYSTEM AND METHOD FOR CONSOLIDATING AND APPLYING MANUFACTURING CONSTRAINTS

Field of the Invention

The present disclosure relates to electronic design automation (EDA), and more specifically, to a method for consolidating and applying design rules in an electronic design.

Discussion of the Related Art

EDA utilizes software tools that may be used in the design and analysis of numerous electronic systems such as printed circuit boards (PCBs) and integrated circuits (ICs). Recent years have seen unprecedented expansion of functional requirements for PCB designs. PCB designers must now cope with a myriad of interconnect topologies and logic signal levels, and must be constantly keen to tolerance stack-up and to implications to signal integrity of an evolving placement/interconnect solution. Designers must balance dozens of variables that may resolve into hundreds of valid and invalid solutions without any real guidance from the available tools toward selecting the best solution. EDA customers have responded to these shortcomings by demanding more route engine power, interactive functionality and diverse capabilities from their CAD tools. Currently, most users solve difficult routing problems interactively through a manual CAD editing environment according to a tedious manual process.

Currently, when designing PCBs or Packages (e.g., system in package, multi-chip module, etc.), the design software does not contain the necessary rules to meet manufacturing requirements. Traditionally, manufacturing checks are performed on manufacturing output files. The designer must check their design for manufacturing issues using manufacturing verification software and then fix those issues using their design software and repeat the cycle. Problems found early in design cycle are much easier to fix then problems found after design is thought to be complete.

When obtaining Design For Manufacturing (DFM) rules from multiple PCB fabricators there may be subtle differences from one PCB Fabricator company to another in the DFM rule values. This is typically not an issue when running low quantities of PCBs, where one fabricator can manage the work load, but in high quantity situations, limiting production to one fabricator is not viable solution.

Summary

In one or more embodiments of the present disclosure, a computer-implemented method for electronic circuit design is provided. The method may include receiving, using a processor, one or more DFM rules files from at least one PCB fabricator and importing the one or more DFM rules files to a DFM rule aggregator database. The method may also include grouping one or more rules associated with the one or more DFM rules files using an automated or manual operation. The method may further include performing automatic or manual rule aggregation on the grouped rules based upon, at least in part, rules aggregation information including a DFM template file.

One or more of the following features may be included. In some embodiments, the method may include performing automatic or manual rule aggregation on the grouped rules based upon, at least in part, a customizable aggregation policy. The method may further include displaying the grouped rules at a graphical user interface configured to display at least one of manufacturing classes, pin information, and numerical values. Grouping may be manual and performing of aggregation may be automatic. The method may further include allowing for a manual override of one or more constraints from the performing of the automatic aggregation. The method may also include determining a number of matching aggregated entries for each vendor in one or more groups. The method may further include generating a rule comparator report based upon, at least in part, the matching. The method may also include receiving one or more constraint sets ("CSets") including usage details and one or more parameters and generating a new attribute. The method may further include generating a template file based upon, at least in part, the new attribute.

In some embodiments, a computer-readable storage medium for electronic design is provided. The computer-readable storage medium may have stored thereon instructions that when executed by a machine result in one or more operations. Operations may include receiving, using a processor, one or more DFM rules files from at least one PCB fabricator and importing the one or more DFM rules files to a DFM rule aggregator database. Operations may also include grouping one or more rules associated with the one or more DFM rules files using an automated or manual operation. Operations may further include performing automatic or manual rule aggregation on the grouped rules based upon, at least in part, rules aggregation information including a DFM template file.

One or more of the following features may be included. In some embodiments, the method may include performing automatic or manual rule aggregation on the grouped rules based upon, at least in part, a customizable aggregation policy. Operations may further include displaying the grouped rules at a graphical user interface configured to display at least one of manufacturing classes, pin information, and numerical values. Grouping may be manual and performing of aggregation may be automatic. Operations may further include allowing for a manual override of one or more constraints from the performing of the automatic aggregation. Operations may also include determining a number of matching aggregated entries for each vendor in one or more groups. Operations may further include generating a rule comparator report based upon, at least in part, the matching. Operations may also include receiving one or more constraint sets ("CSets") including usage details and one or more parameters and generating a new attribute. Operations may further include generating a template file based upon, at least in part, the new attribute.

In one or more embodiments of the present disclosure, a system is provided. The system may include a processor configured to receive one or more DFM rules files from at least one PCB fabricator and a DFM rule aggregator database configured to receive the one or more DFM rules files. The system may also include at least one computing device configured to group one or more rules associated with the one or more DFM rules files using an automated or manual operation. The at least one computing device may be further configured to perform automatic or manual rule aggregation on the grouped rules based upon, at least in part, rules aggregation information including a DFM template file.

One or more of the following features may be included. In some embodiments, performing automatic or manual rule aggregation on the grouped rules may be based upon, at least in part, a customizable aggregation policy.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

Figure 1:
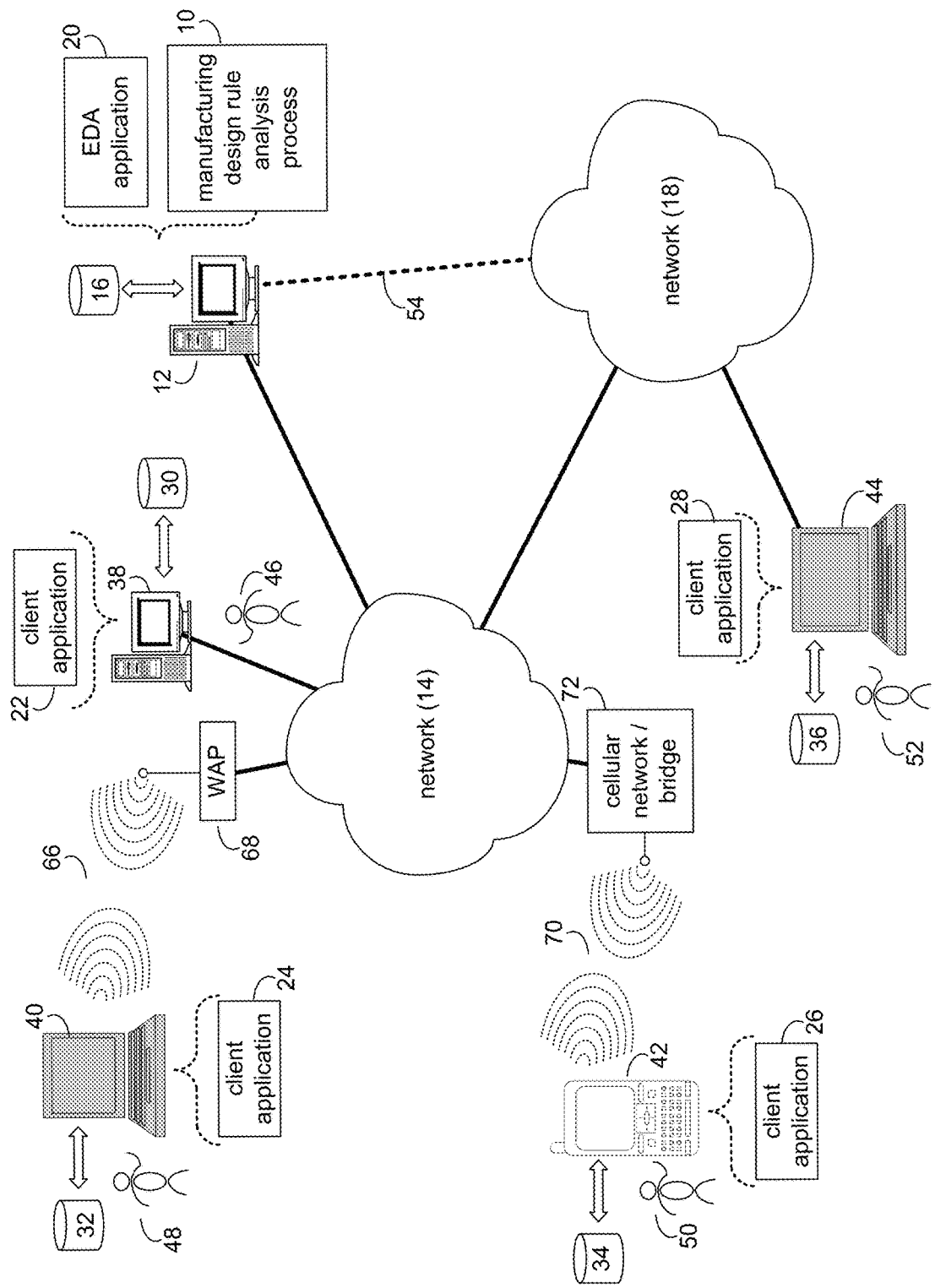
FIG. 1 is a system diagram depicting aspects of the manufacturing design rule process in accordance with an embodiment of the present disclosure.

Referring to FIG. 1, there is shown manufacturing design rule process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the U.S., other countries or both; Novell and NetWare are registered trademarks of Novell Corporation in the U.S., other countries or both; Red Hat is a registered trademark of Red Hat Corporation in the U.S., other countries or both; and Linux is a registered trademark of Linus Torvalds in the U.S., other countries or both.) Additionally/alternatively, the manufacturing design rule process may reside on and be executed, in whole or in part, by a client electronic device, such as a personal computer, notebook computer, personal digital assistant, or the like.

The instruction sets and subroutines of manufacturing design rule process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (e.g., HyperText Transfer Protocol) access to server computer 12 via network 14 (Webserver is a trademark of Novell Corporation in the U.S., other countries, or both; and Apache is a registered trademark of Apache Software Foundation in the U.S., other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for report generation. EDA application 20 may be referred to herein as a design tool.

Manufacturing design rule process 10 may be a stand alone application, or may be an applet/application/script that may interact with and/or be executed within EDA application 20. In addition/as an alternative to being a server-side process, the manufacturing design rule analysis process may be a client-side process (not shown) that may reside on a client electronic device (described below) and may interact with an EDA client application (e.g., one or more of EDA client applications 22, 24, 26, 28). Further, the manufacturing design rule process may be a hybrid server-side/client-side process that may interact with EDA application 20 and an EDA client application (e.g., one or more of client applications 22, 24, 26, 28). As such, the manufacturing design rule process may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize manufacturing design rule process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (e.g., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (e.g., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14. In some embodiments, manufacturing design rule process 10 may be a cloud-based process as any or all of the operations described herein may occur, in whole, or in part, in the cloud or as part of a cloud-based system.

As is known in the art, all of the IEEE 802.11x specifications may use Ethernet protocol and carrier sense multiple access with collision avoidance (e.g., CSMA/CA) for path sharing. The various 802.11x specifications may use phase-shift keying (e.g., PSK) modulation or complementary code keying (e.g., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the U.S., other countries, or both.).

Figure 2:
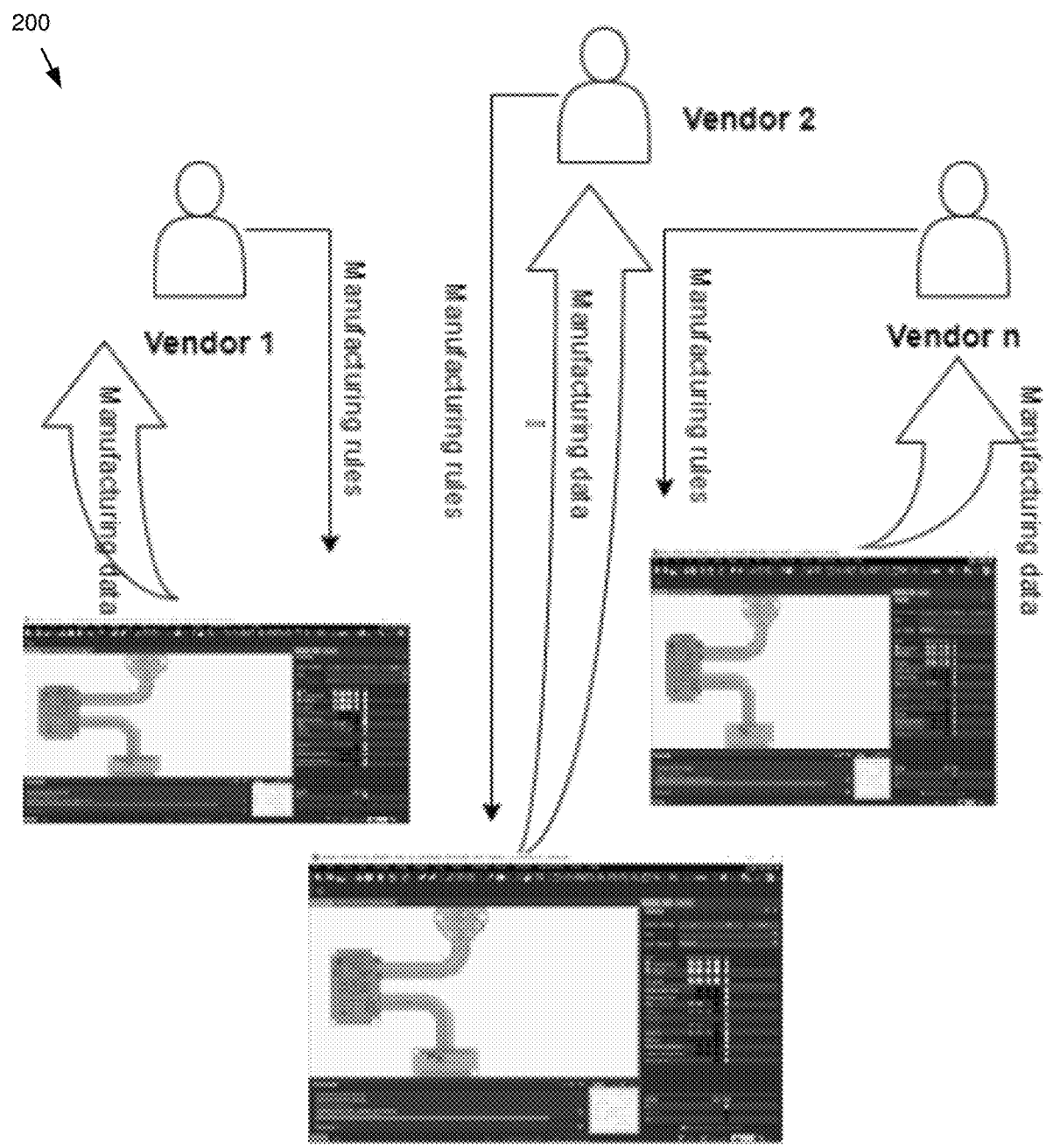
FIG. 2 shows a schematic of an existing approach for handling manufacturing design rules.
Figure 3:
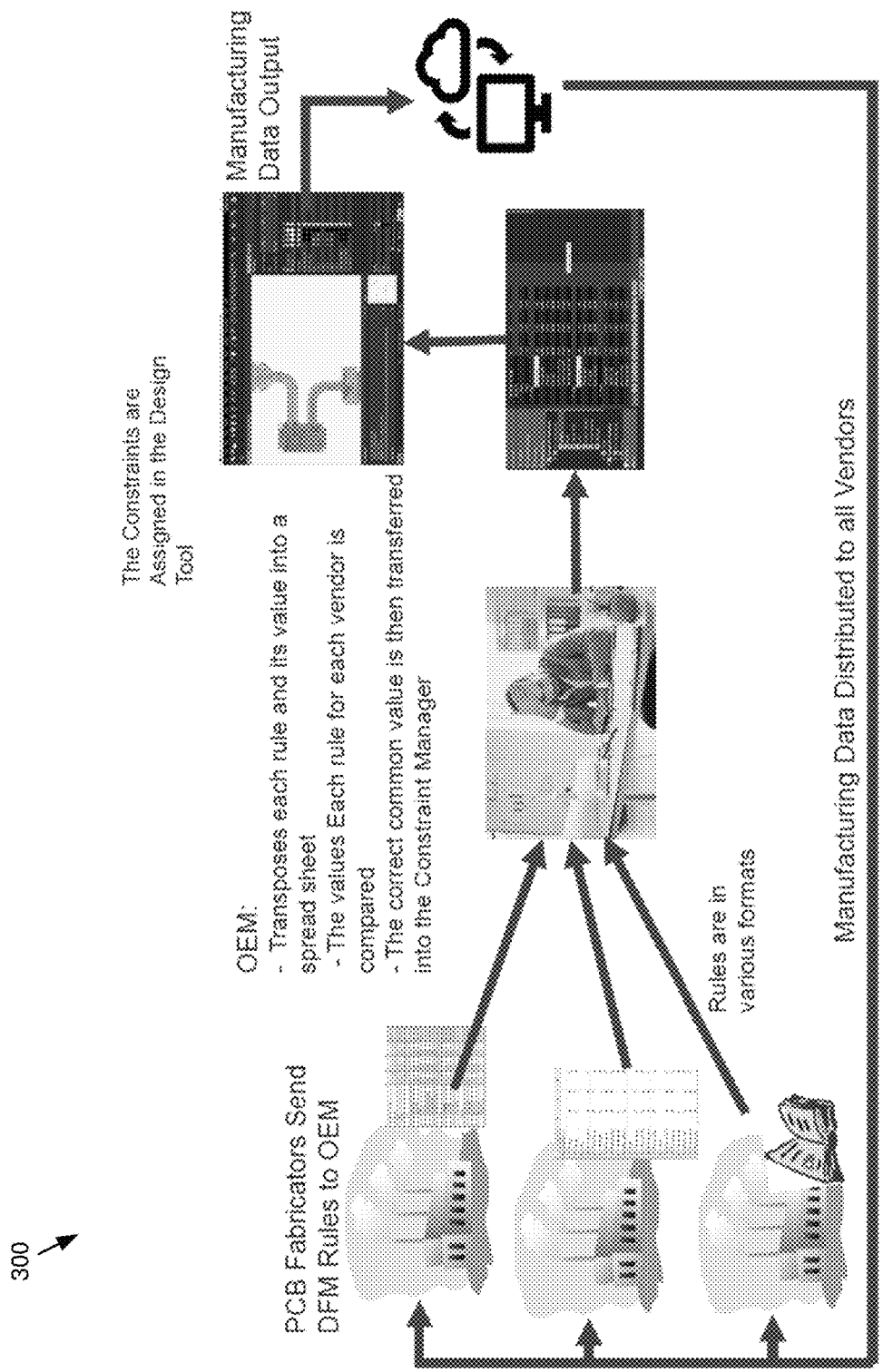
FIG. 3 is a schematic depicting aspects of the manufacturing design rule process in accordance with existing methodology.

Referring now to FIG. 2 a diagram depicting a one to one relationship between a design and a single vendor which represents typical current methodology for companies that do not perform the manual processes shown in FIG. 3. FIG. 3 shows a diagram showing a methodology for handling manufacturing data. As discussed above, when obtaining DFM rules from multiple PCB fabricators there may be subtle differences from one PCB Fabricator company to another in the DFM rule values. This is typically not an issue when running low quantities of PCBs, where one fabricator can manage the work load, but in high quantity situations, limiting production to one fabricator is not viable solution.

To account for differences in DFM rules across fabricators, PCB Designers may create a common denominator rule set that may apply for all fabricators. In existing systems, this process is accomplished manually.

One or more PCB fabricators may send DFM rules to the original equipment manufacturer ("OEM"). The OEM may transpose each rule and its value into a spread sheet. The values for each rule for each vendor may be compared and the correct common value may then be transferred into the Constraint Manager. The rules may be in various formats and one or more constraints may be assigned in the design tool.

In operation, in these existing systems, the user may obtain the rules from multiple sources and consolidate manually by editing the technology file. This is all performed without any tool assisted support, all manual, which is error prone and time consuming. These approaches do not provide a way to compare rules from multiple sources. The user may manually assign the rules to proper layers in the design manually or create a template file manually. There is no tool assisted way to generate the template file and assign rules.

Figure 4:
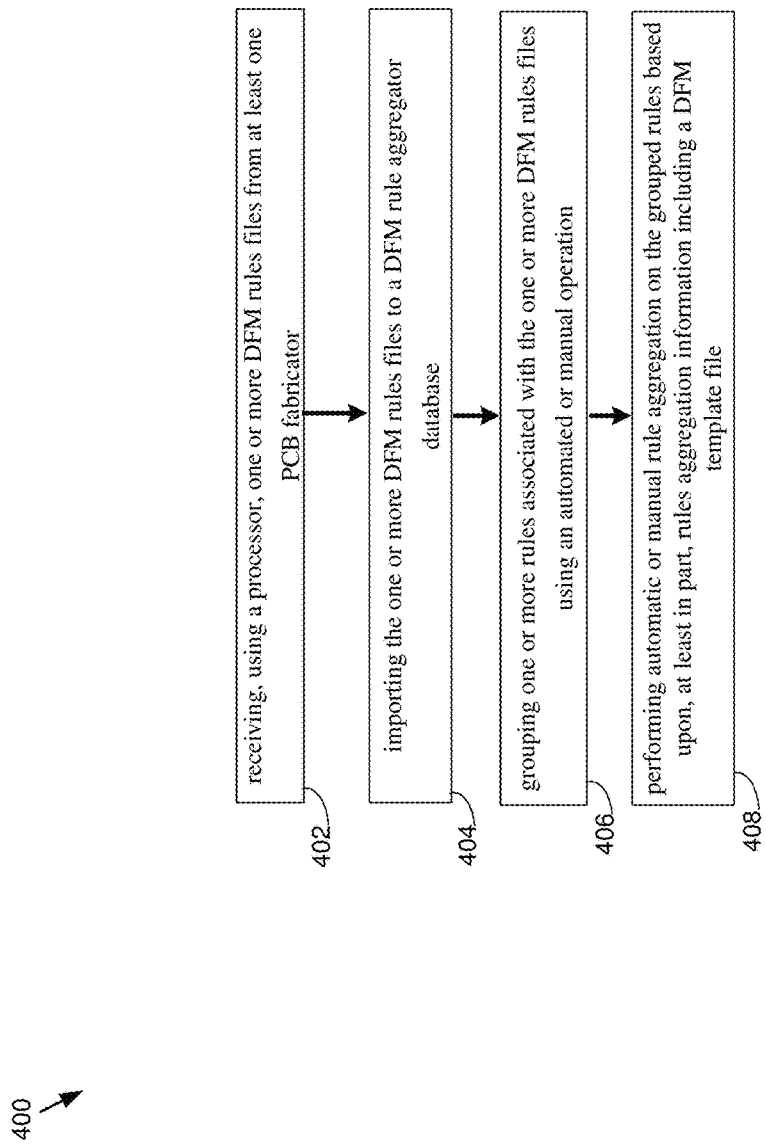
FIG. 4 is a flowchart depicting operations consistent with the manufacturing design rule process of the present disclosure.

Referring now to FIG. 4, a flowchart 400 depicting operations consistent with embodiments of manufacturing design rule process 10 is provided. Some operations may include receiving 402, using a processor, one or more DFM rules files from at least one PCB fabricator and importing 404 the one or more DFM rules files to a DFM rule aggregator database. The method may also include grouping 406 one or more rules associated with the one or more DFM rules files using an automated or manual operations. The method may further include performing 408 automatic or manual rule aggregation on the grouped rules based upon, at least in part, rules aggregation information including a DFM template file. Numerous other operations are also within the scope of the present disclosure as is discussed in further detail hereinbelow.

Figure 5:
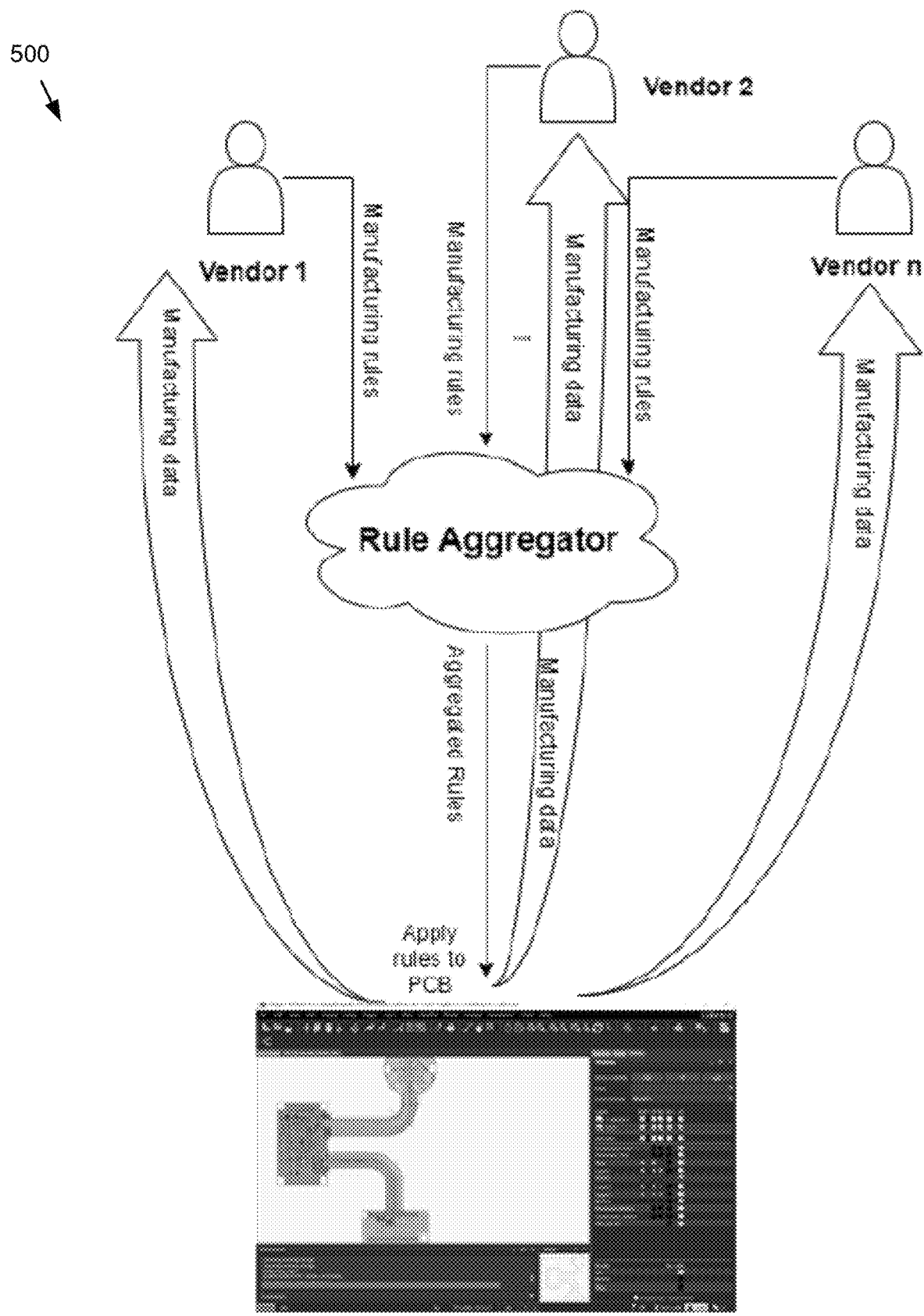
FIG. 5 is a schematic depicting aspects of the manufacturing design rule process in accordance with an embodiment of the present disclosure.

Referring now to FIG. 5, a diagram depicting example embodiments consistent with manufacturing design rule process 10 are provided. As shown in FIG. 5, manufacturing rules and manufacturing data may be shared between one or more vendors. A designer may be tied to one vendor for manufacturing if the rules are not aggregated. Embodiments included herein may allow for vendor independence using aggregated rules. A designer may send the design to any vendor to manufacture as shown in FIG. 5.

Figure 6:
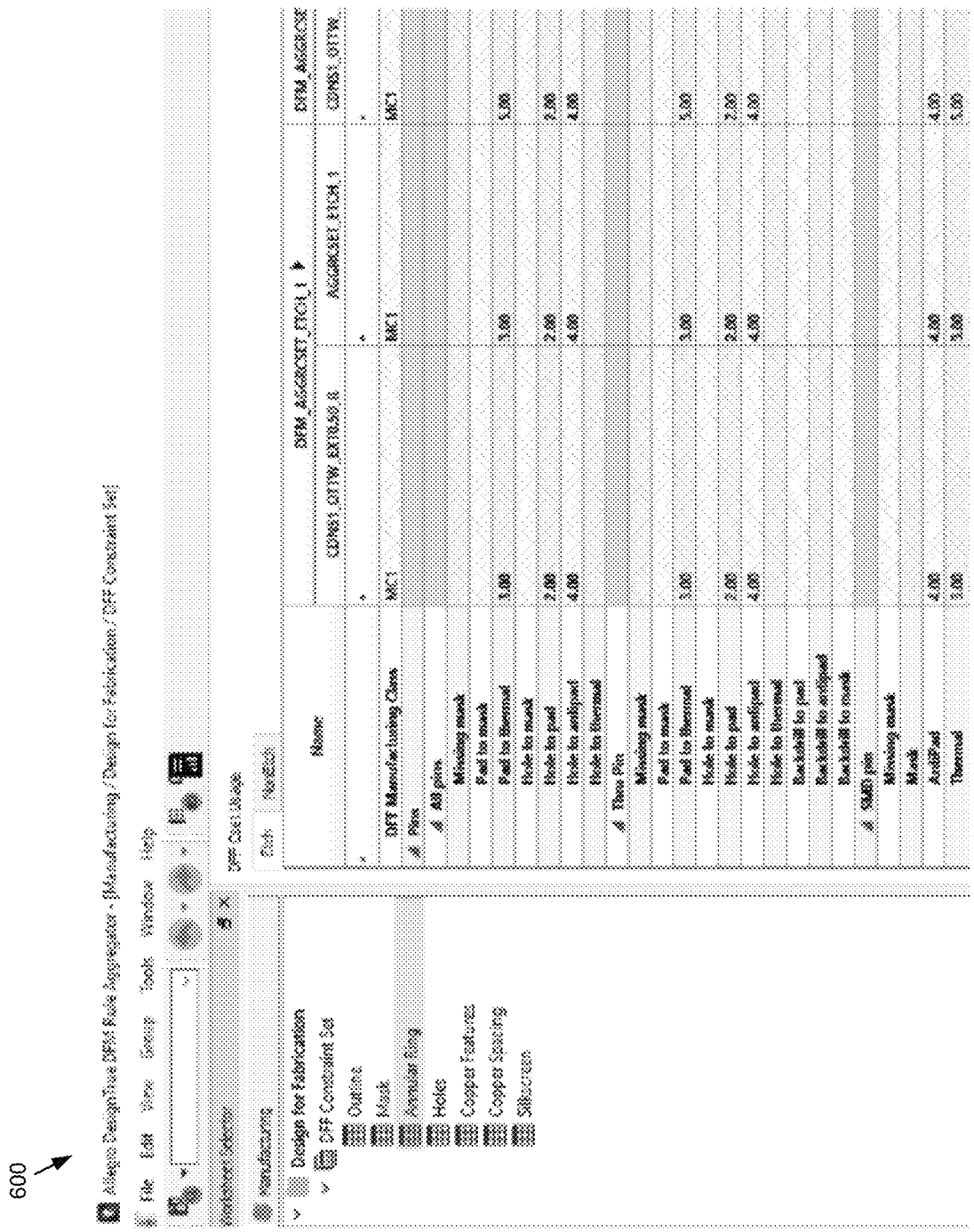
FIG. 6 is a graphical user interface depicting aspects of the manufacturing design rule process in accordance with an embodiment of the present disclosure.

Referring also to FIG. 6, a graphical user interface 600 depicting an embodiment consistent with manufacturing design rule process 10 is provided. Accordingly, embodiments included herein may provide a DFM rule aggregator, which may provide the ability to consolidate/aggregate DFM rules.

In some embodiments, manufacturing design rule process 10 may allow for both a manual and an automated approach. It should be noted that process 10 may provide the capability to customize the aggregation policy for an automated approach. Process 10 may be configured to accept rules from multiple sources and/or export the aggregated rules for future use. As shown in FIG. 6, process 10 may allow the user to view the rules in one single read-only view. Accordingly, process 10 may also be configured to group the rules based on various criteria, some of which may include, but are not limited to, manufacturing classes. This allows the designer to visually compare the values.

In some embodiments, manufacturing design rule process 10 may be configured to create a DFM wizard template. The template may be based on external, internal and/or plane rules. The templates may be used to create assignments using the DFM wizard. It should be noted that the teachings of the present disclosure may be used in accordance with any suitable rules, including, but not limited to, design for fabrication ("DFF"), design for assembly ("DFA"), and design for testability ("DFT") rules.

Figure 7:
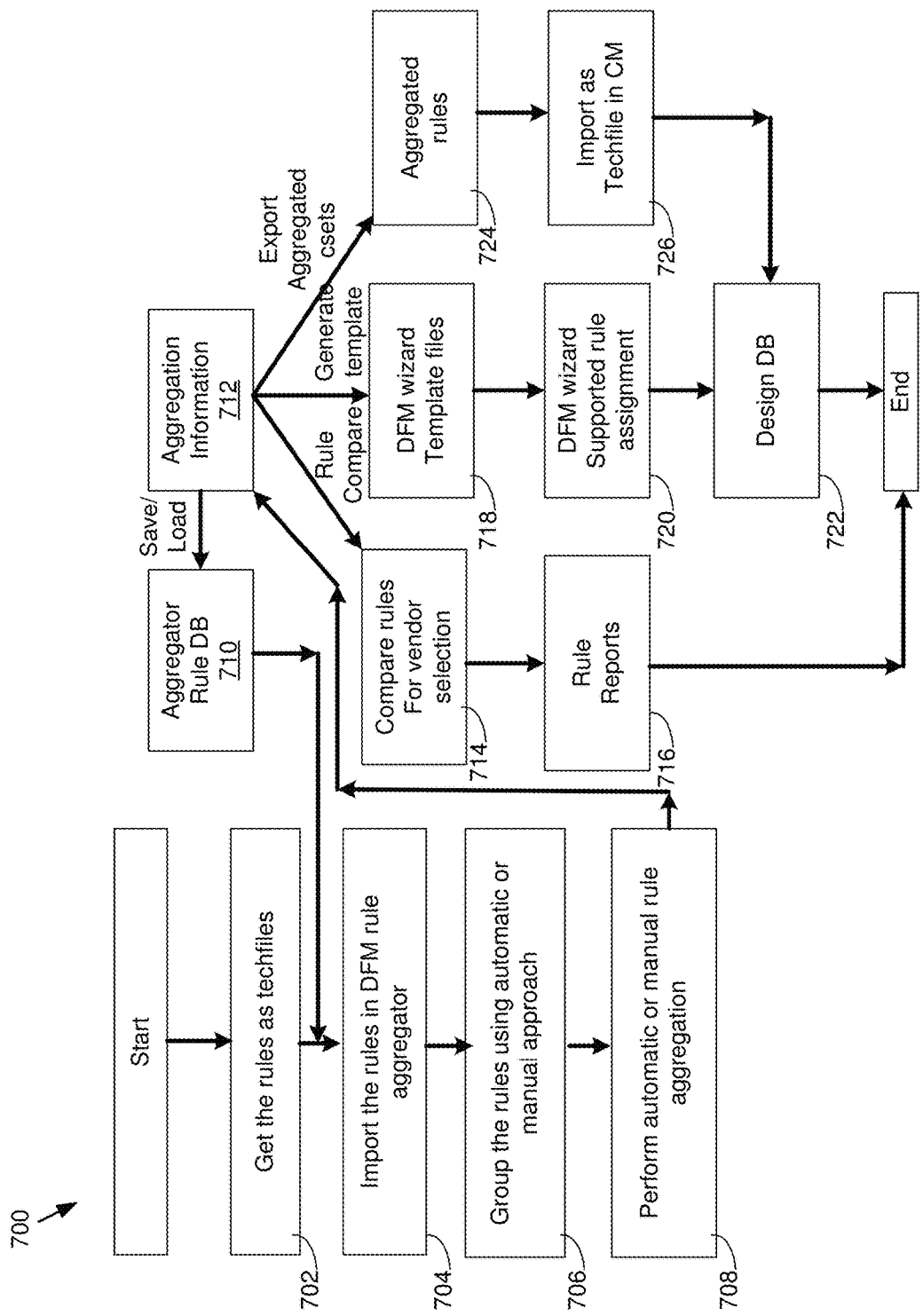
FIG. 7 is a flowchart depicting aspects of the manufacturing design rule process in accordance with an embodiment of the present disclosure.

Referring now to FIG. 7, a flowchart 700 depicting operations consistent with embodiments of manufacturing design rule process 10 is provided. Some operations may include obtaining 702 one or more rules as techfiles and/or obtaining the techfiles from one or more vendors using an EDA application 20, such as Cadence® Allegro® PCB DesignTrue DFM Technology, available from the Assignee of the present disclosure. Manufacturing design rule process 10 may include importing 704 the rules in a DFM rule aggregator. This may include, but is not limited to, using a graphical user interface associated with the aggregator to load one or more techfiles that were obtained from vendor(s). Manufacturing design rule process 10 may include grouping 706 the rules by technology, manufacturing class, material definitions. This may be performed manually or automatically. In some embodiments, the results of the automatic grouping may also be overwritten manually.

In some embodiments, manufacturing design rule process 10 may include performing 708 automatic or manual rule aggregation. Automatic rule aggregation may be performed based upon one or more policies. The user may also aggregate the rules manually or using a combination of automatic followed by manual changes.

In some embodiments, manufacturing design rule process 10 may include an aggregator rule database 710, which may include a saved version of the aggregated rules that may be reused for purpose of re-aggregating. In operation, after loading the aggregator rule database, the user may add or remove techfiles, change policies that effect automatic aggregation, re-aggregate automatically or manually and make additional manual changes. The aggregation information 712 may include an in memory representation of the aggregator database. Manufacturing design rule process 10 may be configured to compare 714 one or more rules for vendor selection. This may include selecting multiple vendor rules and running one or more comparisons, which is very useful when the user hopes to quickly visualize how vendor rules may differ. Manufacturing design rule process 10 may generate one or more rule reports 716, which may include an output of rule comparisons that were created using the vendor comparator.

In some embodiments, manufacturing design rule process 10 may utilize one or more DFM wizard template files 718. These may include standard template files used by the DFM Wizard to load rules intelligently into EDA application 20. The aggregator may generate these files. Manufacturing design rule process 10 may include a DFM Wizard supported rule assignment. Accordingly, manufacturing design rule process 10 may allow a user, via the DFM wizard, to generate one or more CSets and rules based on the EDA application design stackup and may then assign the generated CSet to the correct layers in EDA application 20. The design database 722 may include an EDA database that represents the printed circuit board. One or more aggregated rules 724 may be output as techfiles. These may be the same formatted files as the techfiles that were used as input to the aggregator. The aggregator receives one or more techfiles as an input and generates one or more aggregated techfiles. Manufacturing design rule process 10 may import as techfile in a constraint manager portion of EDA application 20.

Figure 8:
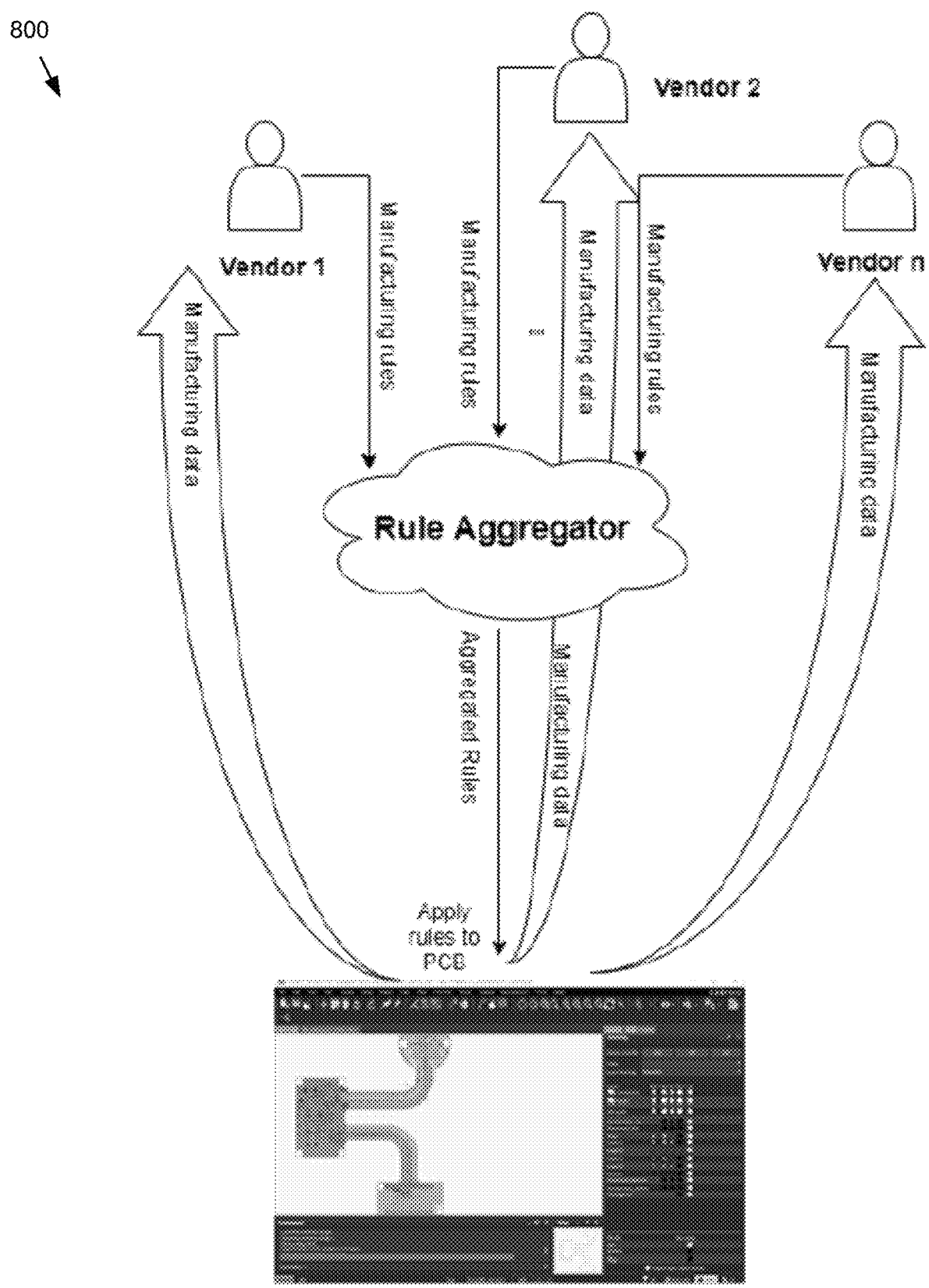
FIG. 8 is a schematic depicting aspects of the manufacturing design rule process in accordance with an embodiment of the present disclosure.

Referring now to FIG. 8, diagram depicting an example embodiment consistent with manufacturing design rule process 10 are provided. As shown in FIG. 8, process 10 may be configured to allow for the system to obtain a common set of rules. In this way, designers may obtain the DFM rules from multiple vendors. These may be aggregated in a manner that any of the selected vendors can support. In some embodiments, the DFM rules may be applied to the PCB. The board may be manufactured by any of the vendors and allows for a vendor neutral design process. The design data generated using the aggregated rules can be communicated back to the vendors for manufacturing. In some embodiments, process 10 may provide a common format for rules to all the vendors and designers. The designers may then utilize the DFM vendor portal to capture the rules.

Figure 9:
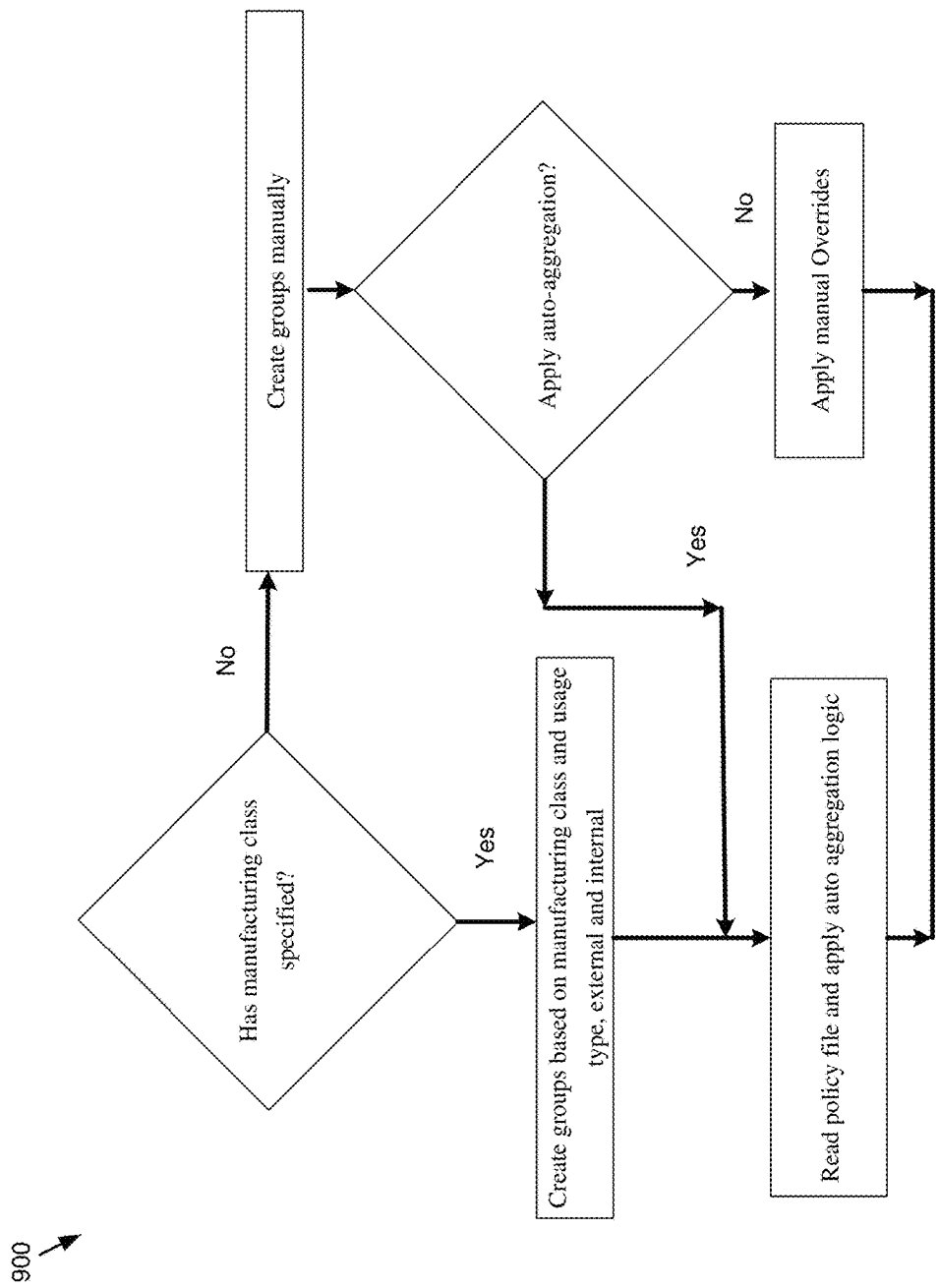
FIG. 9 is a flowchart depicting aspects of the manufacturing design rule process in accordance with an embodiment of the present disclosure.

Referring now to FIG. 9, a flowchart 900 depicting operations consistent with embodiments of manufacturing design rule process 10 is provided. In some embodiments, process 10 may allow for automatic aggregation of rules. In operation, process 10 may determine 902 one or more properties for auto aggregation. For example, manufacturing class in the rules got through DFM portals.

In some embodiments, one or more rules for the same manufacturing class and same usage may be grouped together for a particular type of rules. Within a group the most conservative and/or least conservative rules may be applied to get the preferred value of a constraint. The logic for auto-aggregation may be customized at site level. Based on the type of the rules the aggregation policy may be different. Some types may include, but are not limited to, numeric and rule specific, string type, and/or rule specific, table type, and/or list type. Process 10 may be configured to provide one or more visual cues on aggregated values, which may help to quickly compare rules.

Figure 10:
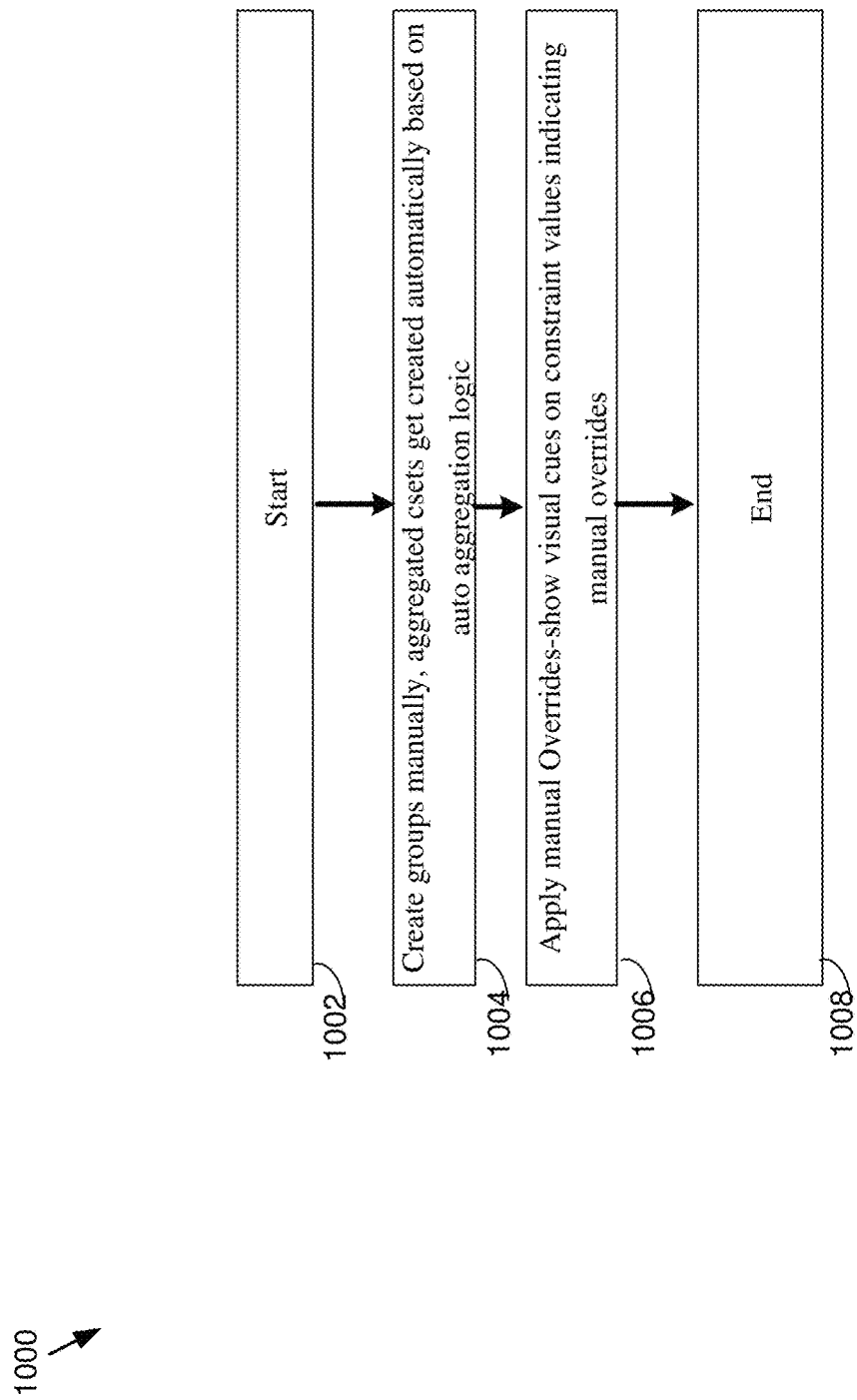
FIG. 10 is a flowchart depicting aspects of the manufacturing design rule process in accordance with an embodiment of the present disclosure.

Referring now to FIG. 10, a flowchart 1000 depicting operations consistent with embodiments of manufacturing design rule process 10 is provided. In some embodiments, process 10 may allow for semi-automatic aggregation of rules. In this example, there is no prerequisite requirement for properties. Process 10 may allow for the creation 1004 of groups manually and aggregated CSets may be created automatically based on auto aggregation logic. Accordingly, the user can add/delete constraint sets "CSets" to/from groups. In some embodiments, a user may manually override 1006 the aggregation policy so that the auto aggregation accounts for customized logic.

In some embodiments, and with regard to aggregated CSets, process 10 may allow a user to manually override constraints from one of the CSets that is part of that group. Accordingly, the process 10 may perform auto aggregation also and then override.

In some embodiments, process 10 may be configured to provide one or more visual cues on one or more aggregated values. These may include different colors for manual overrides. Additionally and/or alternatively, visual cues may be provided for the source CSet on the aggregated CSet.

Figure 11:
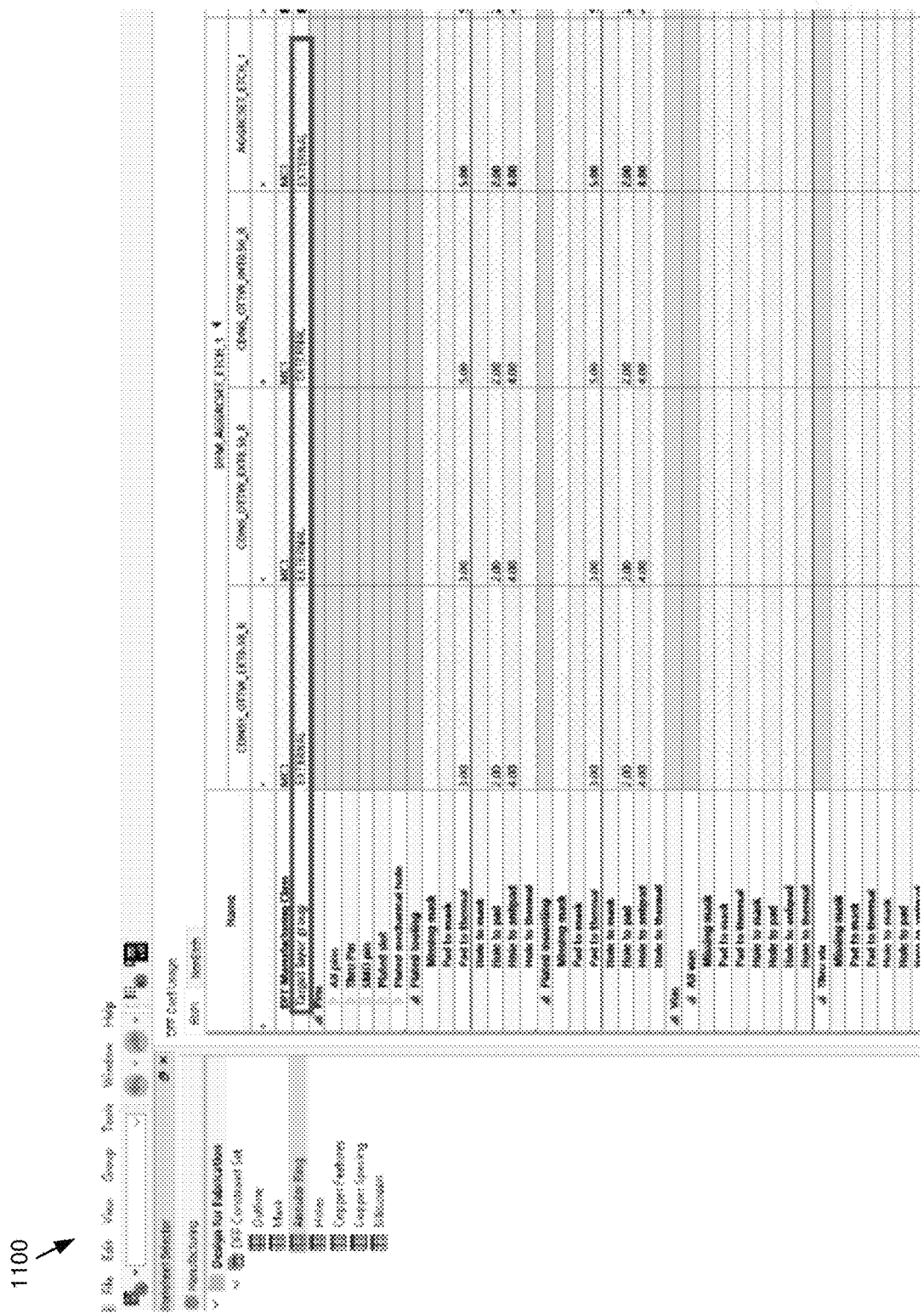
FIG. 11 is a graphical user interface depicting aspects of the manufacturing design rule process in accordance with an embodiment of the present disclosure.

Referring also to FIG. 11, a graphical user interface 1100 depicting an embodiment consistent with manufacturing design rule process 10 is provided. GUI 1100 depicts an example of wizard template generation including rule assignment information. In operation, one or more aggregated CSets may be provided with usage details (e.g., external, internal, plane, etc.), and other parameters like technology (e.g., rigid, flex, etc.). One or more new attributes may be shown in the grid, and may follow aggregation logic. In some embodiments, this information may be extracted if it is present in the name (e.g., CSets from DFM portal, etc.). Process 10 may allow the user to change this by manual overrides. This information may be used for template generation.

In some embodiments, based on a target layer group attribute, the template file for DFF, DFA and DFT may be generated in the specified folder. Here, the template files may be based on the aggregated CSet. If DFA and DFT rules do not exist, template files may not be generated. These template files may be fed into the DFM wizard to get the assignments done.

Figure 12:
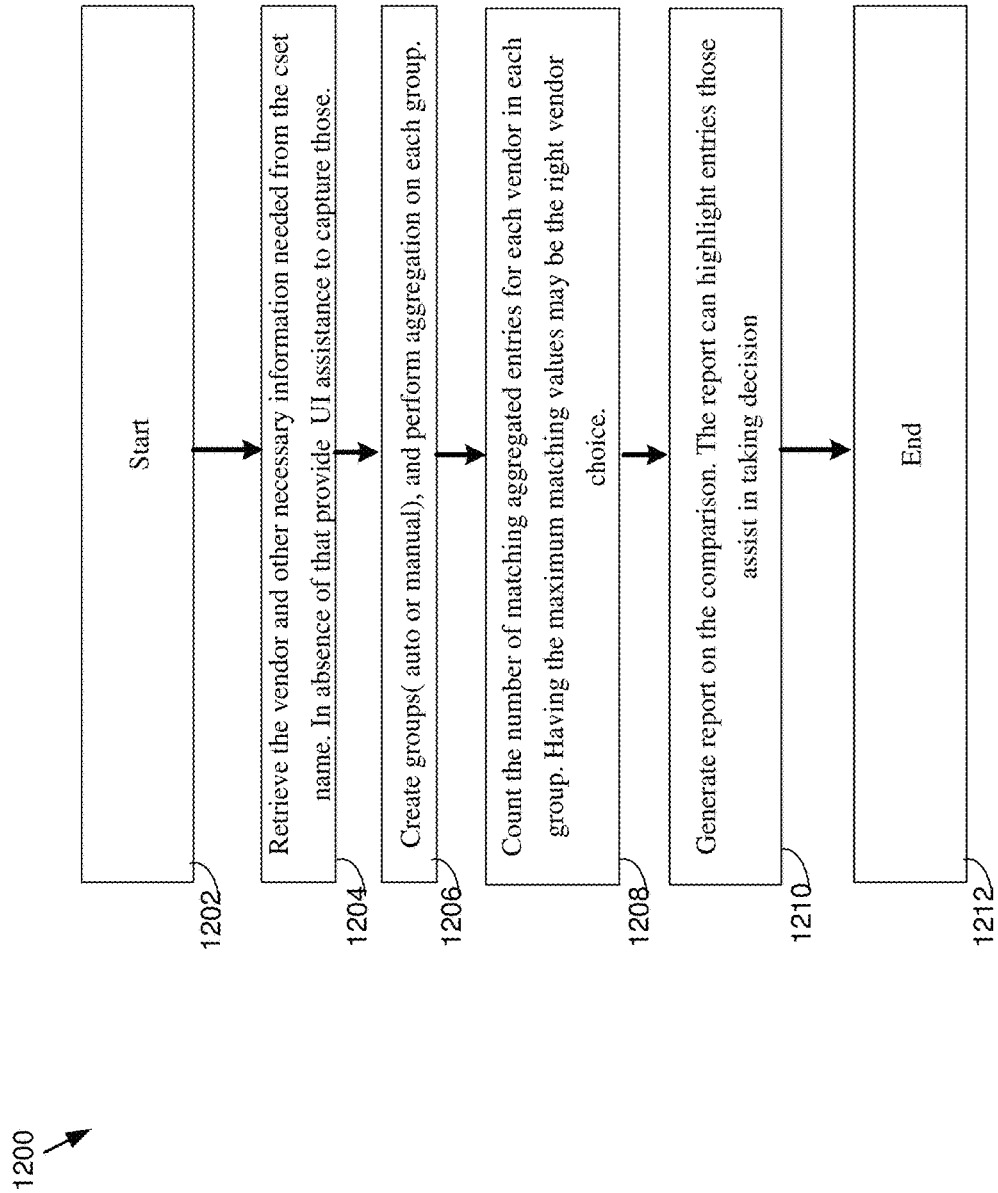
FIG. 12 is a diagram depicting aspects of the manufacturing design rule process in accordance with an embodiment of the present disclosure.
Figure 13:
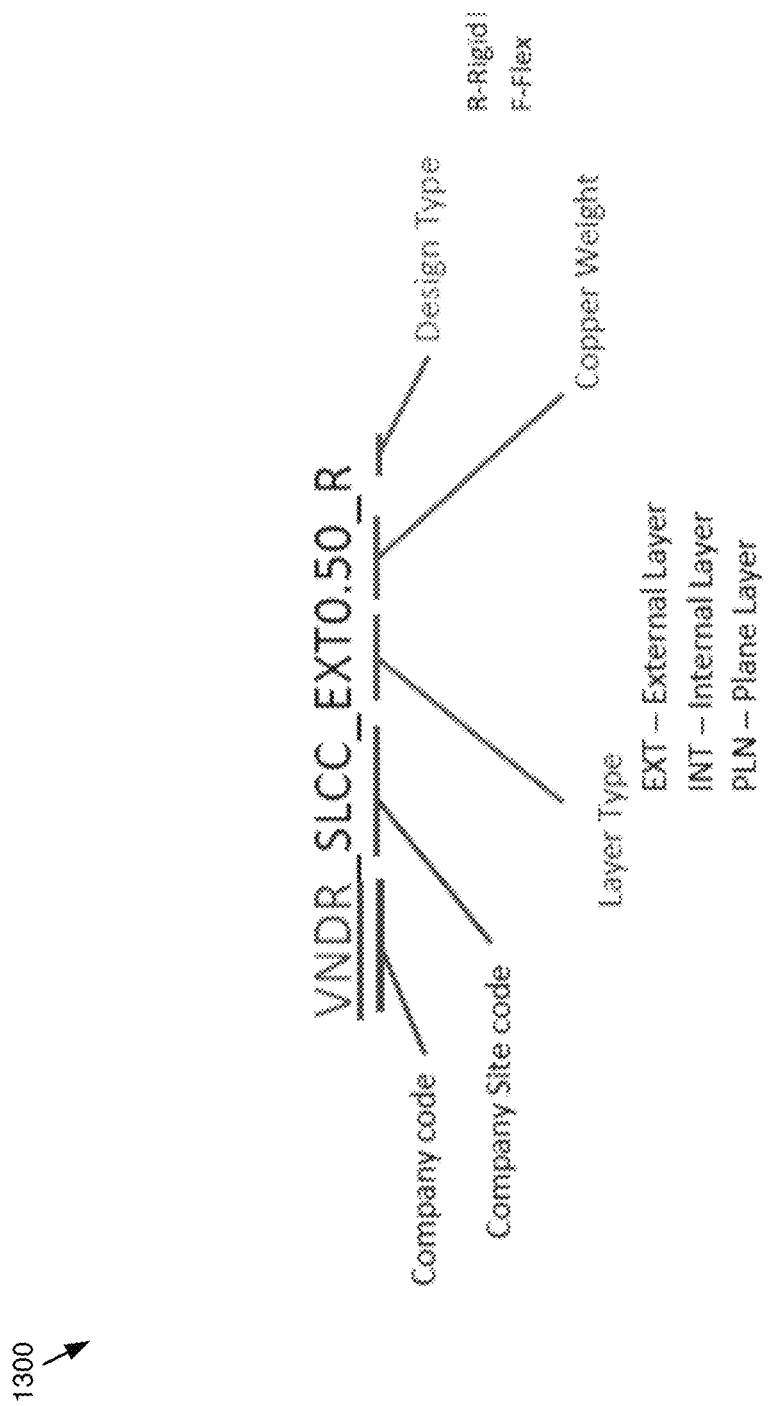
FIG. 13 is a detailed naming convention of CSets based on vendor information provided in file in accordance with an embodiment of the present disclosure.

Referring now to FIGS. 12-13, flowchart 1200 and a diagram 1300 depicting example embodiments of rule aggregation consistent with manufacturing design rule process 10 are provided. The rule aggregation functionality may act as an extension of the aggregation functionality and FIG. 12 shows a methodology for a CSet comparison. In operation, process 10 may provide an automated way to perform the tasks in flowchart 1200 to arrive at a vendor selection decision. In some embodiments, the same approach may be extended to include other parameters some of which may include, but are not limited to, cost (e.g., function of copper weight, min hole size, line width, line to line spacing), technology, etc.

In some embodiments, the process may include additional information derived from the CSet name. These may be captured or retrieved from the encoded name. Have these in the CSets created out of DFM portals as shown in FIG. 13.

In some embodiments, some of the manufacturing rules discussed herein may include, but are not limited to those discussed below. Fabrication Outline to all objects on the electronic design (100+ rules). A fabrication outline check may include a PCB Outline to conductive or non conductive elements that may cause interference in the PCB fabrication and PCB Assembly process. Failure to identify these issues will result in costly low yield and product functional failure. These checks are very important both to bareboard fabrication and assembly. Fabrication Mask checks (20+ rules), which may be very compute and memory intensive and do not exist in PCB/Packaging design systems or exist as a batch check only. A Fabrication Mask checks may include ensuring that minimum requirements to ensure mask adhesion property requirements are met, and proper coverage of masking material to reduce or eliminate the risk of electronics circuits exposure to the natural elements, and provide correct characteristics for the attachment of electronic complete to the PCB. Fabrication Annular ring checks (80+), which do not exist in PCB/Package design systems today. A Fabrication Annular ring check may include a validation rule that defines the acceptable relational values of conductor plane clearances, conductor plane connections and correct surface area for electronic component attachment, and relational drill hole to conductive pad for plating purposes. Fabrication Hole checks (10+ rules), which are not something that a designer thinks about or worries about when laying out design but will be a big issue at manufacturing time. A Fabrication Hole Checks may relate to determining the proper clearances of holes in a PCB to other conductive and non-conductive object on the PCB to prevent fabrication issues and unintentional shorting of electronic circuits. Fabrication Copper Feature Checks (80+ rules), which can be very compute and memory intensive and also do not exist in PCB/Packaging design systems or exist as a batch check only. Fabrication Copper Feature Checks may relate to all conductive feature minimum and maximum size characteristic to ensure proper clearances and current carrying load to prevent unintentional sorting of circuits and current load. Fabrication Copper Spacing (400+ rules), which may be the rules that have the most overlap with Design rules, however spacing for Design is often about runtime functionality not manufacturing. Fabrication Copper Spacing checks may be used to validate that conducive materials maintain minimum clearance size characteristics to ensure proper fabrications process to prevent the unintentional sorting of circuits as well as the unintentional breaking of circuits in a PCB. Fabrication Silkscreen checks (50+ rules), which are all about manufacturing and for the most part have never existed in PCB/Package design systems. Fabrication Silkscreen checks may relate to silkscreen in nomenclature clearances to detect legibility and proper clearances from conducive materials that would interfere with the assembly and circuit testing processes of a PCB product. Assembly Outline checks (10+ rules), which have never existed in design systems and are a common mistake for customers. Assembly outline checks which may be used for the verification of clearances from the PCB boundary to components placed on the PCB to prevent PCB assembly process interferences and final assembly of product into a system. Checking like components including height to the edge of design, large pin count devices to the edge of design and many more. Assembly Package to Package checks (20+ rules). Many checks are done with respect to distances of packages from one another along with orientation. Some of these exist in CAD design systems as batch only checks. Assembly Package to Package checks (20+ rules)-many checks are done with respect to distances of packages from one another along with orientation. Some of these exist in PCB/Package design systems as batch only checks. Assembly Package to Package checks may relate to the spacing requirements to avoid components from interfering with each other during automated or manual placement processes. Assembly Component Lead checks (20+ rules)-these rules are based on the actual physical purchased part and how they align with the features on the design. These do not exist in PCB/Package design systems today. Assembly component lead checks may involve the validation that minimum/maximum requirements are met for the electrical component lead maintains adequate contact area on the PCB conductive pads and holes. Assembly Spacing (30+ rules), which checks various types of spacing between component bodies and holes and traces and fiducials. Not found in existing PCB/Package designs systems. Assembly Pastemask checks (10+ rules), which may check for existence of pastemask and appropriate size and distance from other masks. These checks ensure that minimum requirements are met to ensure the pastemask material volume is adequate for correct adhesion of a component lead to a conductive pad.

Assembly Fiducial checks (2 rules), which may check for existence and minimum count of component fiducials. Assembly Fiducial Checks may ensure that minimum requirements for the number of fiducials (optical registrations points) and proper clearances for automated assembly and test systems. Design for Tests checks (35+ rules).

In some embodiments, EDA application 20 may support a variety of languages and/or standards. Some of these may include, but are not limited to, IEEE-standard languages, the Open Verification Methodology (OVM), the emerging Accellera Universal Verification Methodology (UVM), and the e Reuse Methodology (eRM). EDA application 20 may support one or more software extensions, which may provide a high-throughput channel between the testbench and the device under test (DUT), and enable automated metric driven verification of embedded software exactly as if it were another part of the DUT.

In some embodiments, EDA application 20 may support e, Open Verification Library (OVL), OVM class library, emerging UVM class library, SystemC®, SystemC Verification Library, SystemVerilog, Verilog®, VHDL, PSL, SVA, CPF, as well as numerous other languages. EDA application 20 may be used in accordance with mixed-language, mixed-signal, and low-power designs, across multiple levels of abstraction, and may include the ability to "hot swap" the RTL simulation in/out of numerous accelerators/emulators.

As used in any embodiment described herein, the terms "circuit" and "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof. Embodiments of the present disclosure may be incorporated in whole or in part into any design tools.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method comprising:
   receiving, using a processor, one or more Design For Manufacturing (DFM) rules files from at least one PCB fabricator;
   importing the one or more DFM rules files to a DFM rule aggregator database;
   grouping one or more rules associated with the one or more DFM rules files using an automated or manual operation; and
   performing automatic and manual rule aggregation on the grouped rules based upon, at least in part, rules aggregation information including a DFM template file, wherein manual rule aggregation is performed subsequent to the automatic rule aggregation.

2. The computer-implemented method of claim 1, wherein performing automatic and manual rule aggregation on the grouped rules is based upon, at least in part, a customizable aggregation policy.

3. The computer-implemented method of claim 1, further comprising:
   displaying the grouped rules at a graphical user interface configured to display at least one of manufacturing classes, pin information, and numerical values.

4. The computer-implemented method of claim 1, wherein grouping is manual and performing of aggregation is automatic and manual.

5. The computer-implemented method of claim 4, further comprising:
   allowing for a manual override of one or more constraints from the performing of the automatic aggregation.

6. The computer-implemented method of claim 1, further comprising:
   determining a number of matching aggregated entries for each vendor in one or more groups.

7. The computer-implemented method of claim 6, further comprising:
   generating a rule comparator report based upon, at least in part, the matching.

8. The computer-implemented method of claim 1, further comprising:
   receiving one or more constraint sets ("CSets") including usage details and one or more parameters; and
   generating a new attribute.

9. The computer-implemented method of claim 8, further comprising:
   generating a template file based upon, at least in part, the new attribute.

10. A computer-readable storage medium having stored thereon instructions that when executed by a machine result in the following operations:
    receiving, using a processor, one or more Design For Manufacturing (DFM) rules files from at least one PCB fabricator;
    importing the one or more DFM rules files to a DFM rule aggregator database;
    grouping one or more rules associated with the one or more DFM rules files using an automated or manual operation;
    performing automatic and manual rule aggregation on the grouped rules based upon, at least in part, rules aggregation information including a DFM template file; and
    determining a number of matching aggregated entries for each vendor in one or more groups.

11. The computer-readable storage medium of claim 10, wherein performing automatic and manual rule aggregation on the grouped rules is based upon, at least in part, a customizable aggregation policy.

12. The computer-readable storage medium of claim 10, further comprising:
    displaying the grouped rules at a graphical user interface configured to display at least one of manufacturing classes, pin information, and numerical values.

13. The computer-readable storage medium of claim 10, wherein grouping is manual and performing of aggregation is automatic and manual.

14. The computer-readable storage medium of claim 13, further comprising: allowing for a manual override of one or more constraints from the performing of the automatic aggregation.

15. The computer-readable storage medium of claim 10, further comprising:
    generating a rule comparator report based upon, at least in part, the matching.

16. The computer-readable storage medium of claim 10, further comprising:
    receiving one or more constraint sets ("CSets") including usage details and one or more parameters; and
    generating a new attribute.

17. The computer-readable storage medium of claim 10, further comprising:
    generating a template file based upon, at least in part, the new attribute.

18. A system comprising:
    a processor configured to receive one or more Design For Manufacturing (DFM) rules files from at least one PCB fabricator;
    a DFM rule aggregator database configured to receive the one or more DFM rules files; and
    at least one computing device configured to group one or more rules associated with the one or more DFM rules files using an automated or manual operation, the at least one computing device further configured to perform automatic and manual rule aggregation on the grouped rules based upon, at least in part, rules aggregation information including a DFM template file, wherein manual rule aggregation is performed subsequent to the automatic rule aggregation.

19. The system of claim 18, wherein performing automatic or manual rule aggregation on the grouped rules is based upon, at least in part, a customizable aggregation policy.

* * * * *